(12) United States Patent
Sun et al.

(10) Patent No.: US 11,751,219 B2
(45) Date of Patent: Sep. 5, 2023

(54) RADIO FREQUENCY ALLOCATION AMONG WIRELESS USER EQUIPMENT AND INTEGRATED ACCESS AND BACKHAUL MOBILE TERMINATIONS

(71) Applicant: T-Mobile Innovations LLC, Overland Park, KS (US)

(72) Inventors: David Z. Sun, Broadlands, VA (US); Zheng Fang, McLean, VA (US); Zheng Cai, Fairfax, VA (US); Yu Wang, Fairfax, VA (US)

(73) Assignee: T-MOBILE INNOVATIONS LLC, Overland Park, KS (US)

(*) Notice: Subject to any disclaimer, the term of this patent is extended or adjusted under 35 U.S.C. 154(b) by 191 days.

(21) Appl. No.: 17/237,832

(22) Filed: Apr. 22, 2021

(65) Prior Publication Data

US 2022/0346089 A1    Oct. 27, 2022

(51) Int. Cl.
*H04W 72/29* (2023.01)
*H04B 7/155* (2006.01)
*H04W 60/06* (2009.01)
*H04W 72/0453* (2023.01)
*H04W 88/14* (2009.01)

(52) U.S. Cl.
CPC ............ *H04W 72/29* (2023.01); *H04B 7/155* (2013.01); *H04W 60/06* (2013.01); *H04W 72/0453* (2013.01); *H04W 88/14* (2013.01)

(58) Field of Classification Search
None
See application file for complete search history.

(56) References Cited

U.S. PATENT DOCUMENTS

| | | | |
|---|---|---|---|
| 10,009,260 | B2 | 6/2018 | Hampel et al. |
| 10,136,359 | B2 | 11/2018 | Hampel et al. |
| 10,206,232 | B2 | 2/2019 | Novlan et al. |
| 10,333,574 | B2 | 6/2019 | Baghel et al. |
| 10,356,773 | B2 | 7/2019 | Chen et al. |
| 10,383,136 | B2 | 8/2019 | Wang et al. |

(Continued)

FOREIGN PATENT DOCUMENTS

| | | |
|---|---|---|
| WO | 2020191768 A1 | 10/2020 |
| WO | WO-2021198989 A1 * | 10/2021 |

OTHER PUBLICATIONS

Zte, et al.; "Consideration on multi-hop latency for IAB network"; 3GPP TSG-RAN WG3 #109-e; Aug. 2020; 5 pages; R3-205168; 3GPP; Sophia-Antipolis Cedex, France.

*Primary Examiner* — Nicholas Sloms

(57) ABSTRACT

A wireless access node serves wireless User Equipment (UEs) and wireless Integrated Access and Backhaul Mobile Terminations (IAB MTs). A radio exchanges access communications with the UEs over a frequency channel. The radio receives an IAB request from one of the IAB MTs, and in response, a controller allocates the frequency channel into a UE subchannel and an MT subchannel. The radio now exchanges access communications with the UEs over the UE subchannel and exchanges backhaul communications with the wireless IAB MT over the MT subchannel. The controller reallocates the frequency channel when an IAB MT is added to give the new IAB MT its own MT subchannel. The controller reallocates the frequency channel when an IAB MT is removed to increase the size of the UE subchannel.

20 Claims, 10 Drawing Sheets

(56) References Cited

U.S. PATENT DOCUMENTS

| | | |
|---|---|---|
| 10,536,981 B2 | 1/2020 | Novlan et al. |
| 10,873,920 B2 | 12/2020 | Abedini et al. |
| 2007/0098102 A1* | 5/2007 | Hottinen ................. H04L 5/023 |
| | | 375/260 |
| 2018/0115940 A1 | 4/2018 | Abedini et al. |
| 2019/0357241 A1 | 11/2019 | Wang et al. |
| 2019/0394084 A1* | 12/2019 | Tsai ........................ H04L 43/16 |
| 2020/0146083 A1 | 5/2020 | Wang et al. |
| 2020/0275499 A1 | 8/2020 | Novlan et al. |
| 2020/0337057 A1* | 10/2020 | Abedini ............ H04W 72/0406 |
| 2021/0127389 A1* | 4/2021 | Liu ....................... H04L 5/0087 |
| 2021/0176793 A1* | 6/2021 | Abedini ............... H04L 5/0048 |
| 2021/0194649 A1* | 6/2021 | Qi ......................... H04L 1/0023 |
| 2021/0258889 A1* | 8/2021 | Zhang ............... H04W 56/0045 |
| 2021/0258968 A1* | 8/2021 | Wei ......................... H04L 5/001 |
| 2021/0314793 A1* | 10/2021 | Ananth ............. H04B 7/18541 |
| 2022/0014976 A1* | 1/2022 | Luo ................... H04W 36/0055 |
| 2022/0141749 A1* | 5/2022 | Luo ....................... H04W 36/30 |
| | | 370/331 |
| 2022/0174694 A1* | 6/2022 | Hwang ............. H04W 72/1263 |
| 2022/0201767 A1* | 6/2022 | Wei ....................... H04W 16/10 |
| 2022/0232655 A1* | 7/2022 | Noh ...................... H04W 72/02 |
| 2022/0286196 A1* | 9/2022 | Luo ..................... H04W 72/044 |
| 2022/0322320 A1* | 10/2022 | Liu ..................... H04W 72/044 |

\* cited by examiner

RADIO FREQUENCY ALLOCATION AMONG WIRELESS USER EQUIPMENT AND INTEGRATED ACCESS AND BACKHAUL MOBILE TERMINATIONS

TECHNICAL BACKGROUND

Wireless communication networks provide wireless data services to wireless user devices. Exemplary wireless data services include machine-control, internet-access, media-streaming, and social-networking. Exemplary wireless user devices comprise phones, computers, vehicles, robots, and sensors. The wireless user devices execute user applications to support and use the wireless data services. For example, a smartphone may execute a social-networking application that communicates with a content server over a wireless communication network.

The wireless communication networks have wireless access nodes which exchange wireless signals with the wireless user devices over radio frequency bands. The wireless signals use wireless network protocols like Fifth Generation New Radio (5GNR), Long Term Evolution (LTE), Institute of Electrical and Electronic Engineers (IEEE) 802.11 (WIFI), and Low-Power Wide Area Network (LP-WAN). The wireless access nodes exchange network signaling and user data with network elements that are often clustered together into wireless network cores. The network elements comprise Access and Mobility Management Functions (AMFs), Session Management Functions (SMFs), User Plane Functions (UPFs), and the like.

The wireless access nodes comprise Radio Units (RUs), Distributed Units (DUs), and Centralized Units (CUs). The wireless user devices wirelessly communicate with the RUs which are often mounted on towers. The RUs communicate with nearby DUs over fronthaul links. The DUs communicate with the CUs over mid-haul links. The CUs communicate with the wireless network cores over the backhaul links.

The mid-haul links that couple the DUs and CUs typically comprise wireline links like glass fibers or metal wires. The mid-haul links may also comprise wireless links like point-to-point microwave channels or Integrated Access and Backhaul (IAB) connections. For IAB, the DUs are equipped with IAB Mobile Terminations (MTs) which are essentially wireless user devices that have been adapted to serve DUs. The DUs and CUs are equipped with IAB donor components which are essentially baseband units for the IAB MTs.

Unfortunately, the RUs, DUs, and CUs ineffectively use frequency channels when implementing IAB backhaul. Moreover, the CUs do not efficiently manage the allocation of the frequency channels among the UEs and the IAB MTs.

TECHNICAL OVERVIEW

A wireless access node serves wireless User Equipment (UEs) and wireless Integrated Access and Backhaul Mobile Terminations (IAB MTs). A radio exchanges access communications with the UEs over a frequency channel. The radio receives an IAB request from one of the IAB MTs, and in response, a controller allocates the frequency channel into a UE subchannel and an MT subchannel. The radio now exchanges access communications with the UEs over the UE subchannel and exchanges backhaul communications with the wireless IAB MT over the MT subchannel. The controller reallocates the frequency channel when an IAB MT is added to give the new IAB MT its own MT subchannel. The controller reallocates the frequency channel when an IAB MT is removed to increase the size of the UE subchannel.

DETAILED DESCRIPTION

Figure 1:
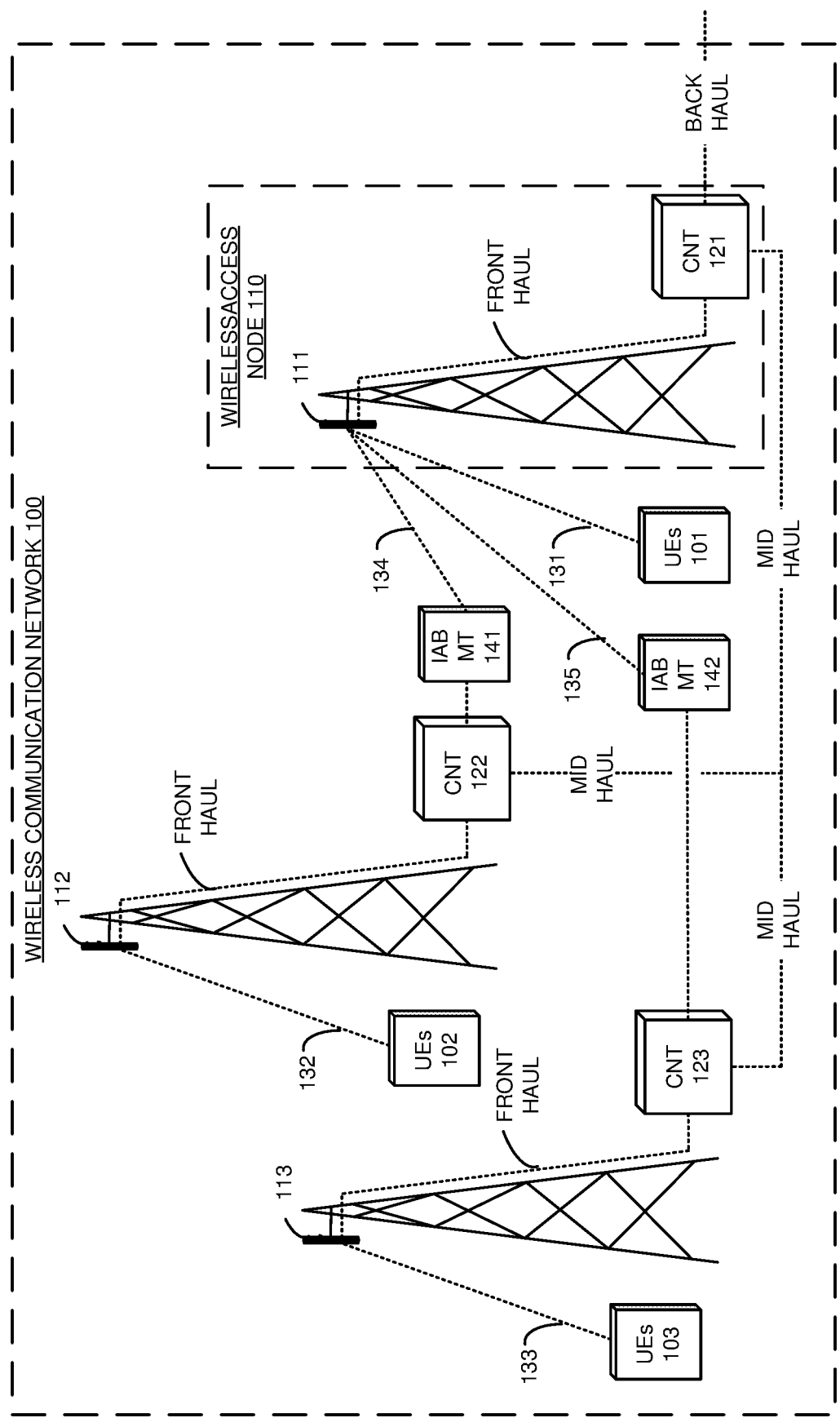
FIG. 1 illustrates a wireless communication network that comprises a wireless access node which allocates frequency channels among wireless User Equipment (UEs) and wireless Integrated Access and Backhaul Mobile Terminations (IAB MTs).

FIG. 1 illustrates wireless communication network 100 that comprises wireless access node 110 that allocates a frequency channel among wireless User Equipment (UEs) 101-103 and wireless Integrated Access and Backhaul Mobile Terminations (IAB MTs) 141-142. Wireless communication network 100 comprises User Equipment (UEs) 101-103, radios 111-113, controllers (CNT) 121-123, and IAB MTs 141-142. Wireless communication network 100 delivers services to UEs 101-103 like internet-access, machine-control, media-streaming, or some other data communications product. UEs 101-103 comprise computers, phones, vehicles, sensors, robots, or some other data appliances with wireless communication circuitry.

Various examples of network operation and configuration are described herein. In some examples, wireless UEs 101-103 wirelessly exchange access communications with respective radios 111-113 over wireless links 131-133. Wireless links 131-133 occupy the frequency channel. Radios 111-113 and respective controllers 121-123 exchange their access communications over fronthaul links. Controllers 122-123 exchange their access communications with controller 121 over midhaul links. Controller 121 exchanges the access communications with a network core or some other data system over backhaul links.

Controller 122 transfers an IAB access request to IAB MT 141—possibly in response to poor performance of the mid-haul links between controllers 121-122. IAB MT 141 wirelessly transfers a corresponding IAB request to controller 121 over wireless link 134 and radio 111. In response to the IAB request, controller 121 allocates the frequency channel into a UE subchannel and an MT subchannel. A subchannel typically comprises a group of adjacent resource blocks in the frequency channel. Controller 121 directs controller 122 to use the MT subchannel and directs controller 123 to use the UE subchannel. Controller 121 directs radio 111 to use the UE subchannel for UEs 101 and to use the MT subchannel for IAB MT 141. Controller 122 directs radio 112 to use the MT subchannel for UEs 102. Controller 123 directs radio 113 to use the UE subchannel for UEs 103. UEs 101 wirelessly exchange access communications with radio 111 over wireless links 131 which occupy the UE subchannel. UEs 102 wirelessly exchange access communications with radio 112 over wireless links 132 which occupy the MT subchannel. UEs 103 wirelessly exchange access communications with radio 113 over wireless links 133 which occupy the UE subchannel. Radios 111-113 and respective controllers 121-123 exchange their access communications over the fronthaul links. Controller 122 exchanges its access communications with controller 121 over IAB MT 141, wireless link 134 in the MT subchannel, radio 111, and the fronthaul link to controller 121. Controller 123 exchanges its access communications with controller 121 over the midhaul links. Controller 121 exchanges the access communications with the network core or other data systems over the backhaul links. The subchannels in this paragraph significantly reduce the interference between UEs 101 and IAB MT 141, between UEs 103 and IAB MT 141, between UEs 101 and UEs 102, and between UEs 102 and UEs 103.

In some examples when controller 122 is using IAB MT 141 for midhaul, controller 123 transfers another IAB access request to IAB MT 142—possibly in response to poor performance over the mid-haul links between controllers 121 and 123. IAB MT 142 wirelessly transfers a corresponding IAB request to controller 121 over wireless link 135 and radio 111. In response to this IAB request, controller 121 allocates the frequency channel into a new UE subchannel, a first MT subchannel, and a second MT subchannel. Controller 121 directs controller 122 to use the first MT subchannel and directs controller 123 to use the second MT subchannel. Controller 121 directs radio 111 to use the new UE subchannel for UEs 101, the first MT subchannel for IAB MT 141, and the second MT subchannel for IAB MT 142. Controller 122 directs radio 112 to use the first MT subchannel for UEs 102. Controller 123 directs radio 113 to use the second MT subchannel for UEs 103. UEs 101 wirelessly exchange access communications with radio 111 over wireless links 131 which occupy the new UE subchannel. UEs 102 wirelessly exchange access communications with radio 112 over wireless links 132 which occupy the first MT subchannel. UEs 103 wirelessly exchange access communications with radio 113 over wireless links 133 which occupy the second MT subchannel. Radios 111-113 and respective controllers 121-123 exchange their access communications over the fronthaul links. Controller 122 exchanges its access communications with controller 121 over IAB MT 141, wireless link 134 in the first MT subchannel, radio 111, and the fronthaul link to controller 121. Controller 123 exchanges its access communications with controller 121 over IAB MT 142, wireless link 135 in the second MT subchannel, radio 111, and the fronthaul link to controller 121. Controller 121 exchanges the access communications with the network core or other data systems over the backhaul links. The subchannels in this paragraph significantly reduce the interference between UEs 101, IAB MT 141, and IAB MT 142 and between UEs 101, UEs 102, and UEs 103.

In some examples when controllers 122-123 are using IAB MTs 141-142 for midhaul, controller 123 transfers an IAB deregistration to IAB MT 142—possibly in response to a performance improvement over the mid-haul links between controllers 121 and 123. IAB MT 142 wirelessly transfers a corresponding IAB deregistration to controller 121 over wireless link 135 and radio 111. In response to the IAB deregistration, controller 121 reallocates the frequency channel into a new UE subchannel and a new MT subchannel. Controller 121 directs controller 122 to use the new MT subchannel and directs controller 123 to use the new UE subchannel. Controller 121 directs radio 111 to use the new UE subchannel for UEs 101 and to use the new MT subchannel for IAB MT 141. Controller 122 directs radio 112 to use the new MT subchannel for UEs 102. Controller 123 directs radio 113 to use the new UE subchannel for UEs 103. UEs 101 wirelessly exchange access communications with radio 111 over wireless links 131 in the new UE subchannel. UEs 102 wirelessly exchange access communications with radio 112 over wireless links 132 in the new MT subchannel. UEs 103 wirelessly exchange access communications with radio 113 over wireless links 133 in the new UE subchannel. Radios 111-113 and respective controllers 121-123 exchange their access communications over the fronthaul links. Controller 122 exchanges its access communications with controller 121 over IAB MT 141, wireless link 134 in the new MT subchannel, radio 111, and the fronthaul link to controller 121. Controller 123 exchanges its access communications with controller 121 over the midhaul links. Controller 121 exchanges the access communications with the network core or other data systems over the backhaul links. The subchannels in this paragraph significantly reduce the interference between UEs 101 and IAB MT 141, between UEs 103 and IAB MT 141, between UEs 101 and UEs 102, and between UEs 102 and UEs 103.

In some examples and when controller 122 is using IAB MT 441 for midhaul, but controller 123 is not using IAB MT 442 for midhaul, controller 122 transfers an IAB deregistration to IAB MT 141—possibly in response to a performance improvement over the mid-haul links between controllers 121-122. IAB MT 141 wirelessly transfers a corresponding IAB deregistration to controller 122 over wireless link 134 and radio 111. In response to the IAB deregistration, controller 121 deallocates the remaining MT subchannel, and the UE subchannel uses the entire frequency channel. Controller 121 directs controllers 122-123 to use the entire frequency channel. Controllers 121-123 direct radios 111-113 to use the entire frequency channel for UEs 101-103. UEs 101-103 wirelessly exchange access communications with radios 111-113 over wireless links 131-133 which may now use frequencies across the entire frequency channel. Radios 111-113 and controllers 121-123 exchange the access communications over the fronthaul links. Controllers 122-123 exchange their access communications with controller 121 over the midhaul links. Controller 121 exchanges the access communications with the network core or other data systems over the backhaul links.

Advantageously, radios 111-113 and controllers 121-123 effectively use the frequency channel when implementing IAB backhaul. Moreover, controller 121 efficiently manages the allocation of the frequency channel among UEs 101-103 and IAB MTs 141-142.

UEs 101-103 and IAB MTs 141-142 communicate with wireless access nodes 111-113 over technologies like Fifth Generation New Radio (5GNR), Long Term Evolution (LTE), Institute of Electrical and Electronic Engineers (IEEE) 802.11 (WIFI), LP-WAN or some other wireless protocol. The wireless communication technologies use electromagnetic frequencies in the low-band, mid-band, high-band, or some other portion of the electromagnetic spectrum. The fronthaul, midhaul, and backhaul links use metallic links, glass fibers, radio channels, or some other communication media. The fronthaul, midhaul, and backhaul links use Institute of Electrical and Electronic Engineers (IEEE) 802.3 (Ethernet), WIFI, Ethernet, IP, Time Division Multiplex (TDM), Data Over Cable System Interface Specification (DOCSIS), General Packet Radio Service Transfer Protocol (GTP), 5GNR, LTE, WIFI, virtual switching, inter-processor communication, bus interfaces, and/or some other data communication protocols.

UEs 101-103, IAB MTs 141-142, and radios 111-113 comprise antennas, amplifiers, filters, modulation, analog/digital interfaces, microprocessors, software, memories, transceivers, bus circuitry, and the like. Controllers 121-123 comprise microprocessors, software, memories, transceivers, bus circuitry, and the like. The microprocessors comprise Digital Signal Processors (DSP), Central Processing Units (CPU), Graphical Processing Units (GPU), Application-Specific Integrated Circuits (ASIC), and/or the like. The memories comprise Random Access Memory (RAM), flash circuitry, disk drives, and/or the like. The memories store software like operating systems, user applications, radio applications, and network functions. The microprocessors retrieve the software from the memories and execute the software to drive the operation of wireless communication network 100 as described herein.

Figure 2:
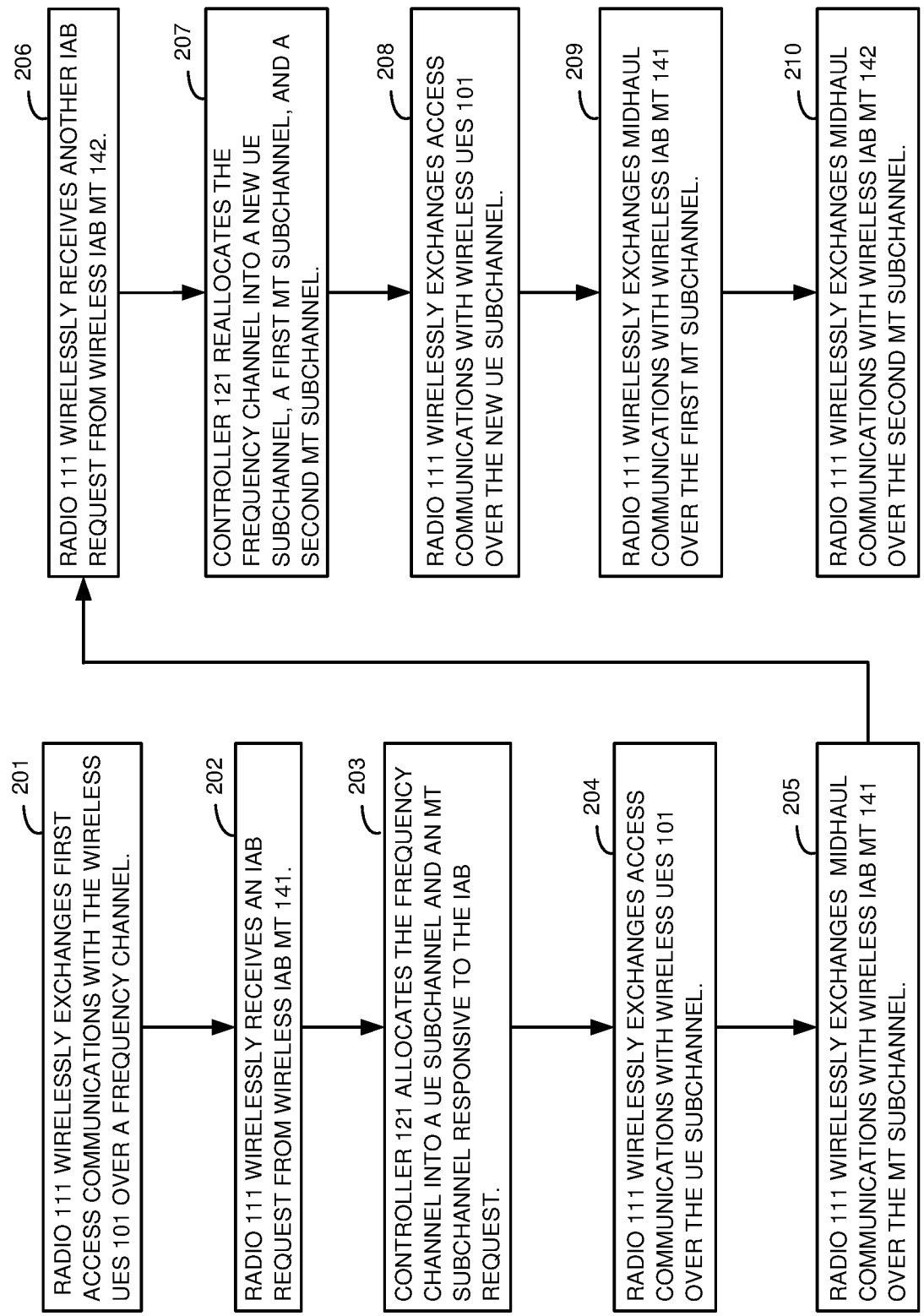
FIG. 2 illustrates an exemplary operation of the wireless access node to allocate the frequency channels among the wireless UEs and wireless IAB MTs.

FIG. 2 illustrates an exemplary operation of wireless access node 110 to allocate the frequency channels among wireless UEs 101-103 and wireless IAB MTs 141-142. The operation may vary in other examples. Radio 111 wirelessly exchanges first access communications with the wireless UEs 101 over a frequency channel (201). Radio 111 wirelessly receives an IAB request from wireless IAB MT 141 (202). Controller 121 allocates the frequency channel into a UE subchannel and an MT subchannel responsive to the IAB request (203). Radio 111 wirelessly exchanges access communications with wireless UEs 101 over the UE subchannel (204). Radio 111 wirelessly exchanges midhaul communications with wireless IAB MT 141 over the MT subchannel (205). Radio 111 wirelessly receives another IAB request from wireless IAB MT 142 (206). Controller 121 reallocates the frequency channel into a new UE subchannel, a first MT subchannel, and a second MT subchannel (207). Radio 111 wirelessly exchanges access communications with wireless UEs 101 over the new UE subchannel (208). Radio 111 wirelessly exchanges midhaul communications with wireless IAB MT 141 over the first MT subchannel (209). Radio 111 wirelessly exchanges midhaul communications with the wireless IAB MT 142 over the second MT subchannel (210).

Figure 3:
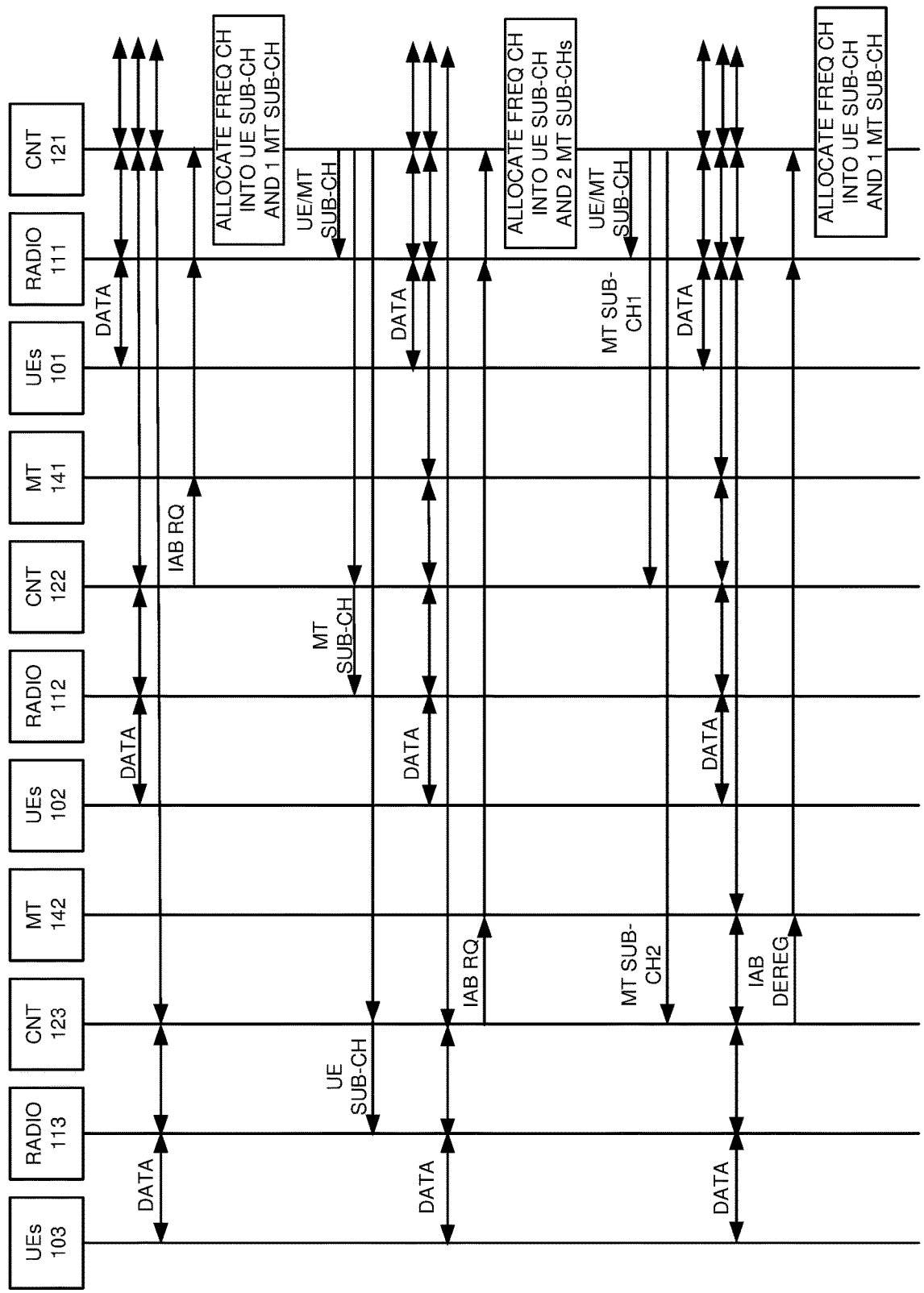
FIG. 3 illustrates an exemplary operation of the wireless access node to allocate the frequency channels among the wireless UEs and wireless IAB MTs.

FIG. 3 illustrates an exemplary operation of wireless access node 110 to allocate the frequency channels among wireless UEs 101-103 and wireless IAB MTs 141-142. The operation may vary in other examples. UEs 101-103 and respective radios 111-113 wirelessly exchange user data over the frequency channel. Radios 111-113 and respective controllers 121-123 exchange the user data. Controllers 122-123 exchange the user data with controller 121. Controller 121 exchanges the user data over the backhaul links.

Controller 122 transfers an IAB access request to IAB MT 141. IAB MT 141 wirelessly transfers a corresponding IAB request to controller 121 over radio 111. In response to the IAB request, controller 121 allocates the frequency channel into a UE subchannel and an MT subchannel. Controller 121 directs radio 111 to use the UE subchannel for UEs 101 and the MT subchannel for IAB MT 141. Controller 121 directs controller 122 to use the MT subchannel and directs controller 123 to use the UE subchannel. Controller 122 directs radio 112 to use the MT subchannel for UEs 102. Controller 123 directs radio 113 to use the UE subchannel for UEs 103.

UEs 101 wirelessly exchange user data with radio 111 over wireless links 131 which occupy the UE subchannel. UEs 102 wirelessly exchange user data with radio 112 over wireless links 132 which occupy the MT subchannel. UEs 103 wirelessly exchange user data with radio 113 over wireless links 133 which occupy the UE subchannel. Radios 111-113 and respective controllers 121-123 exchange their user data over the fronthaul links. Controller 122 exchanges its user data with controller 121 over IAB MT 141, wireless link 134 in the MT subchannel, radio 111, and the fronthaul link to controller 121. Controller 123 exchanges its user data with controller 121 over the midhaul links. Controller 121 exchanges the user data with the network core or other data systems over the backhaul links.

When controller 122 is still using IAB MT 141 for midhaul, controller 123 transfers an IAB access request to IAB MT 142. IAB MT 142 wirelessly transfers a corresponding IAB request to controller 121 over wireless link 135 and radio 111. In response to this IAB request, controller 121 allocates the frequency channel into a new UE subchannel, a first MT subchannel, and a second MT subchannel. Controller 121 directs radio 111 to use the new UE subchannel for UEs 101, the first MT subchannel for IAB MT 141, and the second MT subchannel for IAB MT 142. Controller 121 directs controller 122 to use the first MT subchannel and directs controller 123 to use the second MT subchannel. Controller 122 directs radio 112 to use the first MT subchannel for UEs 102. Controller 123 directs radio 113 to use the second UE subchannel for UEs 103.

UEs 101 wirelessly exchange user data with radio 111 over wireless links 131 in the new UE subchannel. UEs 102 wirelessly exchange user data with radio 112 over wireless links 132 in the first MT subchannel. UEs 103 wirelessly exchange user data with radio 113 over wireless links 133 in the second MT subchannel. Radios 111-113 and respective controllers 121-123 exchange their user data over the fronthaul links. Controller 122 exchanges its user data with controller 121 over IAB MT 141, wireless link 134 in the first MT subchannel, radio 111, and the fronthaul link to controller 121. Controller 123 exchanges its user data with controller 121 over IAB MT 142, wireless link 135 in the second MT subchannel, radio 111, and the fronthaul link to controller 121. Controller 121 exchanges the access communications with the network core and/or other data systems over the backhaul links.

When controllers 122-123 are using IAB MTs 141-142 for midhaul, controller 123 transfers an IAB deregistration to IAB MT 142. IAB MT 142 wirelessly transfers a corresponding IAB deregistration to controller 121 over wireless link 135, radio 111, and the fronthaul link to controller 121. In response to the IAB deregistration, controller 121 allocates the frequency channel back into the UE subchannel and the MT subchannel as described above. If controller 121 then receives an IAB deregistration for IAB MT 141, controller 121 deallocates the remaining frequency channel and the entire frequency channel is again used by each of controllers 121-123.

Figure 4:
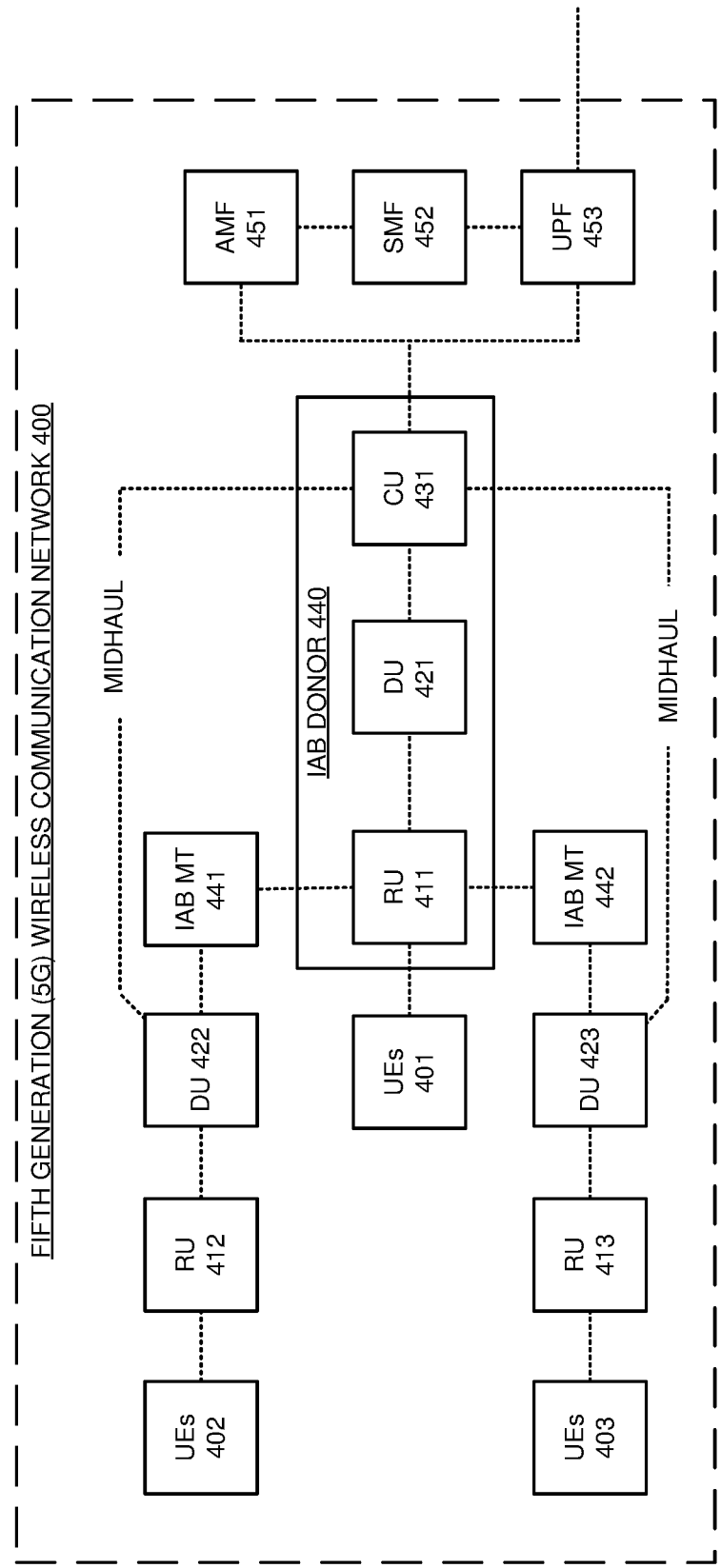
FIG. 4 illustrates a Fifth Generation (5G) communication network that comprises Radio Units (RUs), Distributed Units (DUs), and a Centralized Unit (CU) to allocate frequency channels among wireless UEs and wireless IAB MTs.

FIG. 4 illustrates a Fifth Generation (5G) communication network 400 that comprises Radio Units (RUs) 411-413, Distributed Units (DUs) 421-423, and Centralized Unit (CU) 431 to allocate a frequency channel among wireless UEs 401-403 and wireless IAB MTs 441-442. 5G wireless communication network 400 comprises an example of wireless communication network 100, although network 100 may vary from this example. 5G wireless communication network 400 comprises: UEs 401-403, RUs 411-413, DUs 421-423, CU 431, IAB MTs 441-442, Access and Mobility Management Functions (AMF) 451, Session Management Function (SMF) 452, and User Plane Function (UPF) 453. RU 411, DU 421, and CU 431 comprise IAB donor 440. RUs 411-413 comprise examples of radios 111-113, although radios 111-113 may differ. DUs 421-423 and CU 431 comprise examples of controllers 121-123, although controllers 121-123 may differ.

UEs 401 attach to CU 431 over a frequency channel, RU 411, and DU 421. CU 431 registers UEs 401 with AMF 451. CU 431 and UEs 401 establish data paths over the frequency channel, RU 411, and DU 421. CU 431, AMF 451, and SMF 452 establish corresponding data paths between CU 431 and UPF 453. UEs 401 communicate with external systems over the frequency channel, RU 411, DU 421, CU 431, and UPF 453. UEs 402 attach to CU 431 over the frequency channel, RU 412, and DU 422. CU 431 registers UEs 402 with AMF 451. CU 431 and UEs 402 establish data paths over the frequency channel, RU 412 and DU 422. CU 431, AMF 451, and SMF 452 establish corresponding data paths between CU 431 and UPF 453. UEs 402 communicate with external systems over the frequency channel, RU 412, DU 422, CU 431, and UPF 453. UEs 403 attach to CU 431 over the frequency channel, RU 413, and DU 423. CU 431 registers UEs 403 with AMF 451. CU 431 and UEs 403 establish data paths over the frequency channel, RU 413 and DU 423. CU 431, AMF 451, and SMF 452 establish corresponding data paths between CU 431 and UPF 453. UEs 403 communicate with external systems over the frequency channel, RU 413, DU 423, CU 431, and UPF 453.

When the performance of the midhaul link between DU 422 and CU 431 falters, DU 422 requests an IAB link to CU 431 from IAB MT 441. IAB MT 441 attaches to CU 431 over RU 411 and DU 421. DU 422 connects with CU 431 over IAB MT 441, RU 411, and DU 421. In response to the IAB link, CU 431 allocates the frequency channel into a UE subchannel for UEs 401 and 403 and an MT subchannel for IAB MT 441 and UEs 402. CU 431 directs RU 411 to use the UE subchannel for UEs 401 and to use the MT subchannel for IAB MT 441. CU 431 directs DU 422 to use the MT subchannel for UEs 402. CU 431 directs DU 423 to use the UE subchannel for UEs 403. UEs 401 communicate with external systems over the UE subchannel, RU 411, DU 421, CU 431, and UPF 453. UEs 402 communicate with external systems over the MT subchannel, RU 412, DU 422, IAB MT 441, DU 421, CU 431, and UPF 453. UEs 403 communicate with external systems over the UE subchannel, RU 413, DU 423, CU 431, and UPF 453. The subchannels in this paragraph mitigate interference between 1) UEs 401 and IAB MT 441, 2) UEs 403 and IAB MT 441, 3) UEs 401 and UEs 402, and 4) UEs 402 and UEs 403. IAB MT 441 and DU 422 communicate to mitigate interference in the MT subchannel between IAB MT 441 and UEs 402. DUs 421 and 423 communicate to mitigate interference in the UE subchannel between UEs 401 and UEs 403.

When the performance of the midhaul link between DU 423 and CU 431 falters and DU 422 is already using IAB MT 441, DU 423 requests an IAB link to CU 431 from IAB MT 442. IAB MT 442 attaches to CU 431 over RU 411 and DU 421. DU 423 connects with CU 431 over IAB MT 442, RU 411, and DU 421. In response to the IAB link, CU 431 allocates the frequency channel into a UE subchannel for UEs 401, a first MT subchannel for IAB MT 441 and UEs 402, and a second MT subchannel for IAB MT 442 and UEs 403. CU 431 directs RU 411 to use the UE subchannel for UEs 401, to use the first MT subchannel for IAB MT 441, and to use the second MT subchannel for IAB MT 442. CU 431 directs DU 422 to use the first MT subchannel for UEs 402. CU 431 directs DU 423 to use the second MT subchannel for UEs 403. UEs 401 communicate with external systems over the UE subchannel, RU 411, DU 421, CU 431, and UPF 453. UEs 402 communicate with external systems over the first MT subchannel, RU 412, DU 422, IAB MT 441, RU 411, DU 421, CU 431, and UPF 453. UEs 403 communicate with external systems over the second MT subchannel, RU 413, DU 423, IAB MT 442, RU 411, DU 421, CU 431, and UPF 453. The subchannels in this paragraph mitigate interference between 1) UEs 401, IAB MT 441, and IAB MT 442, 2) UEs 402 and IAB MT 142, 3) UEs 403 and IAB MT 141, and 4) UEs 401, 402, and 403. IAB MT 441 and DU 422 communicate to mitigate interference between IAB MT 441 and UEs 402. IAB MT 442 and DU 423 communicate to mitigate interference between IAB MT 442 and UEs 403.

When the performance of the midhaul link between DU 423 and CU 431 falters while the midhaul link between DU 422 and CU 431 remains adequate, DUs 422-423 switch roles. DU 422 would use the midhaul link to CU 431, and DU 423 would use IAB MT 442, the MT subchannel, RU 411, and DU 421 for midhaul. UEs 402 would communicate with external systems over the UE subchannel, RU 412, DU 422, CU 431, and UPF 453. UEs 403 would communicate with external systems over the MT subchannel, RU 413, DU 423, IAB MT 442, CU 431, and UPF 453. When the performance of the midhaul link between DU 423 and CU 431 improves while DU 422 is using IAB MT 441, the situation reverts to the use of the UE subchannel for UEs 401 and UEs 403, and the use of the MT subchannel for IAB MT 441 and UEs 402. When the performance of the midhaul link between DU 422 and CU 431 improves while DU 423 is using IAB MT 442, the situation reverts to the use of the UE subchannel for UEs 401 and UEs 402, and the use of the MT subchannel for IAB MT 442 and UEs 403. When the performance of the midhaul links between DUs 422-423 and CU 431 improve so neither of IAB MTs 441-442 are used, the situation reverts to the use of the entire frequency channel for UEs 401-403. Additional groups of IAB MTs, DUs, RUs, and UEs could be served by IAB donor 440 in a similar manner.

Figure 5:
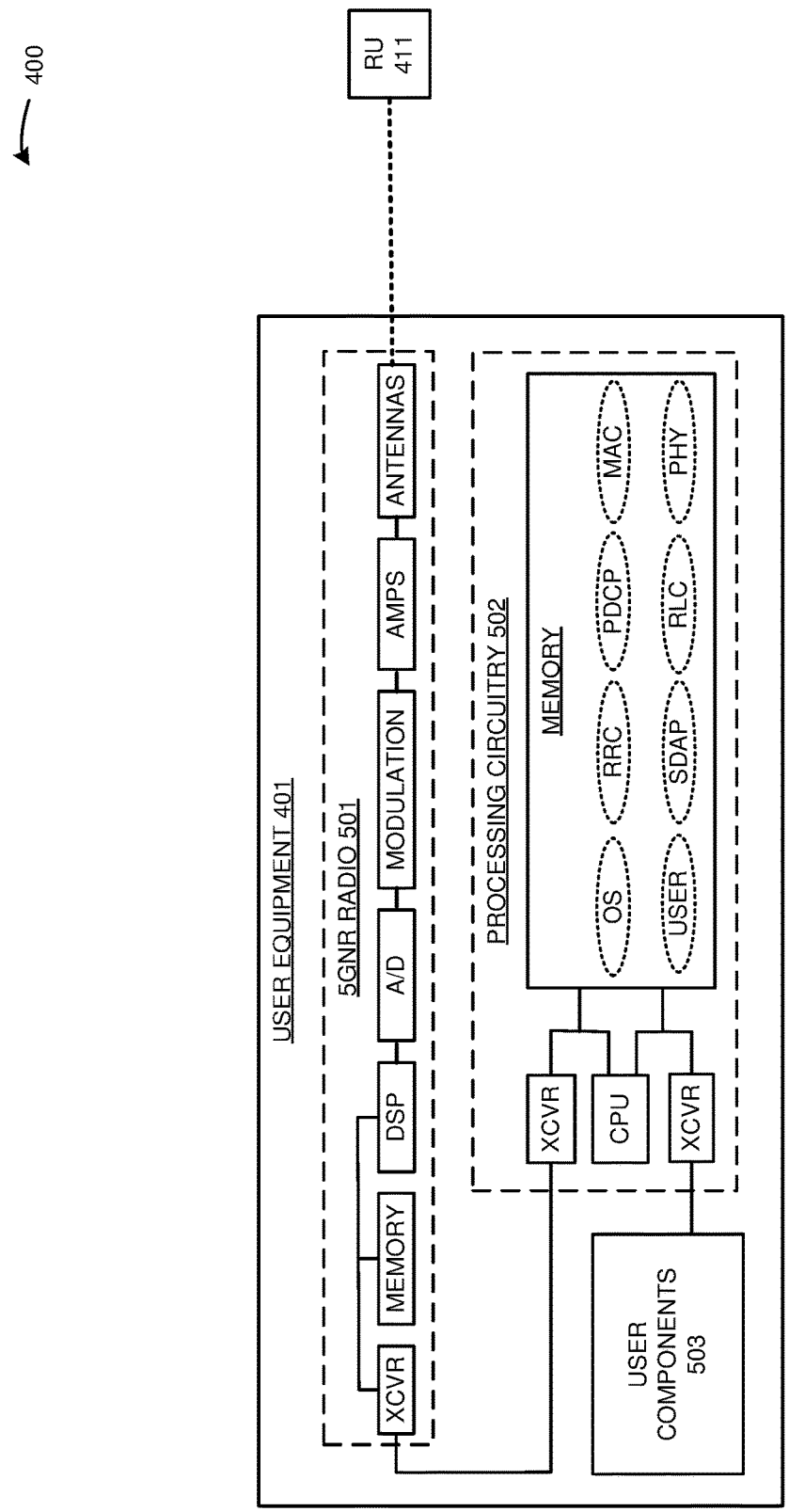
FIG. 5 illustrates a wireless UE in the 5G wireless communication network.

FIG. 5 illustrates one of wireless UEs 401 in 5G wireless communication network 400. UE 401 comprises an example of UEs 101-103, although UEs 101-103 may differ. UEs 402-403 could be similar to UE 401. UE 401 comprises 5G New Radio (5GNR) radio 501, processing circuitry 502, and user components 503. 5GNR radio 501 comprises antennas, amplifiers, filters, modulation, analog-to-digital interfaces, DSP, memory, and transceivers that are coupled over bus circuitry. Processing circuitry 502 comprises memory, CPU, user interfaces and components, and transceivers that are coupled over bus circuitry. The memory in processing circuitry 502 stores an operating system, user applications (USER), and network applications for Physical Layer (PHY), Media Access Control (MAC), Radio Link Control (RLC), Packet Data Convergence Protocol (PDCP), Service Data Adaption Protocol (SDAP), and Radio Resource Control (RRC). The antennas in 5GNR radio 501 are wirelessly coupled to RU 411 over a 5GNR link in the frequency channel. Transceivers (XCVRs) in 5GNR radio 501 are coupled to transceivers in processing circuitry 502. Transceivers in processing circuitry 502 are coupled to user components 503 like displays, controllers, and memory. The CPU in processing circuitry 502 executes the operating system, user applications, and network applications to exchange network signaling and user data with RU 411 over 5GNR radio 501. In particular, the MAC in UE 401 uses resource blocks in the proper channel or subchannel as directed by the MAC in DU 421—and the MACs in UEs 402-403 would also use the resource blocks in the proper channel or subchannel as directed by the respective MACs in DUs 422-423.

Figure 6:
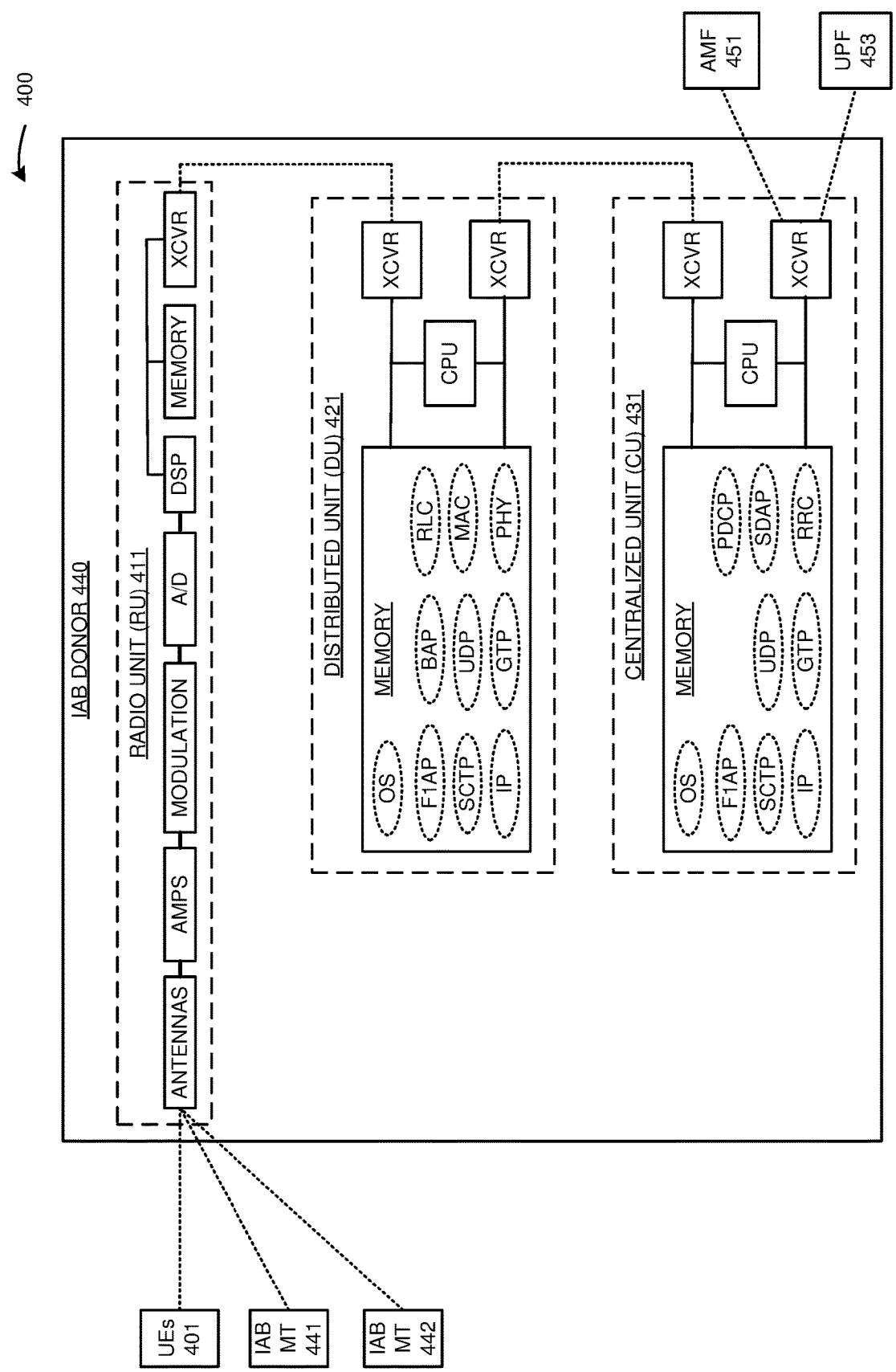
FIG. 6 illustrates an IAB donor in the 5G wireless communication network.

FIG. 6 illustrates IAB donor 440 in 5G wireless communication network 400. IAB donor 440 comprises an example of wireless access node 110, although node 110 may differ. IAB donor 440 comprises RU 411, DU 421, and CU 431. RUs 412-413 could be similar to RU 411. DUs 422-423 could be similar to DU 421. RU 411 comprises antennas, amplifiers, filters, modulation, analog-to-digital interfaces, DSP, memory, and transceivers that are coupled over bus circuitry. DU 421 and CU 431 comprise memory, CPU, and transceivers that are coupled over bus circuitry. The memory in DU 421 stores operating systems and network applications for PHY, MAC, RLC, IP, Backhaul Adaption Protocol (BAP), F1 Application Part (F1AP), Stream Control Transmission Protocol (SCTP), User Data Protocol (UDP), and General Purpose Radio Service Transfer Protocol (GTP). The memory in CU 431 stores operating systems and network applications for F1AP, SCTP, IP, UDP, GTP, PDCP, SDAP, and RRC. The antennas in RU 411 are wirelessly coupled to UEs 401 and IAB MTs 441-442 over 5GNR links. Transceivers in RU 411 are coupled to transceivers in DU 421 over fronthaul links like enhanced Common Public Radio Interface (eCPRI). Transceivers in DU 421 are coupled to transceivers in CU 431 over mid-haul links. Transceivers in CU 431 are coupled to AMF 451 and UPF 453 over backhaul links. The CPU in DU 421 executes its operating system and network applications to exchange 5GNR data units with RU 411 and to exchange 5GNR data units with CU 431. The CPU in CU 431 executes its operating system and network applications to exchange the 5GNR data units with DU 421, exchange N2/N1 signaling with AMF 451 and exchange N3 data with UPF 453. In particular, the F1AP in CU 431 allocates the frequency channel into a UE subchannel and MT subchannels when MTs 441-442 become active. The F1AP in CU 431 directs the F1APs in DUs 421-423 to use the appropriate channels. The F1APs in DUs 421-423 direct their MACs to use the appropriate channels. The MACs in DUs 421-423 direct their UEs 401-403 and IAB MTS 441-442 to use the appropriate channels.

Figure 7:
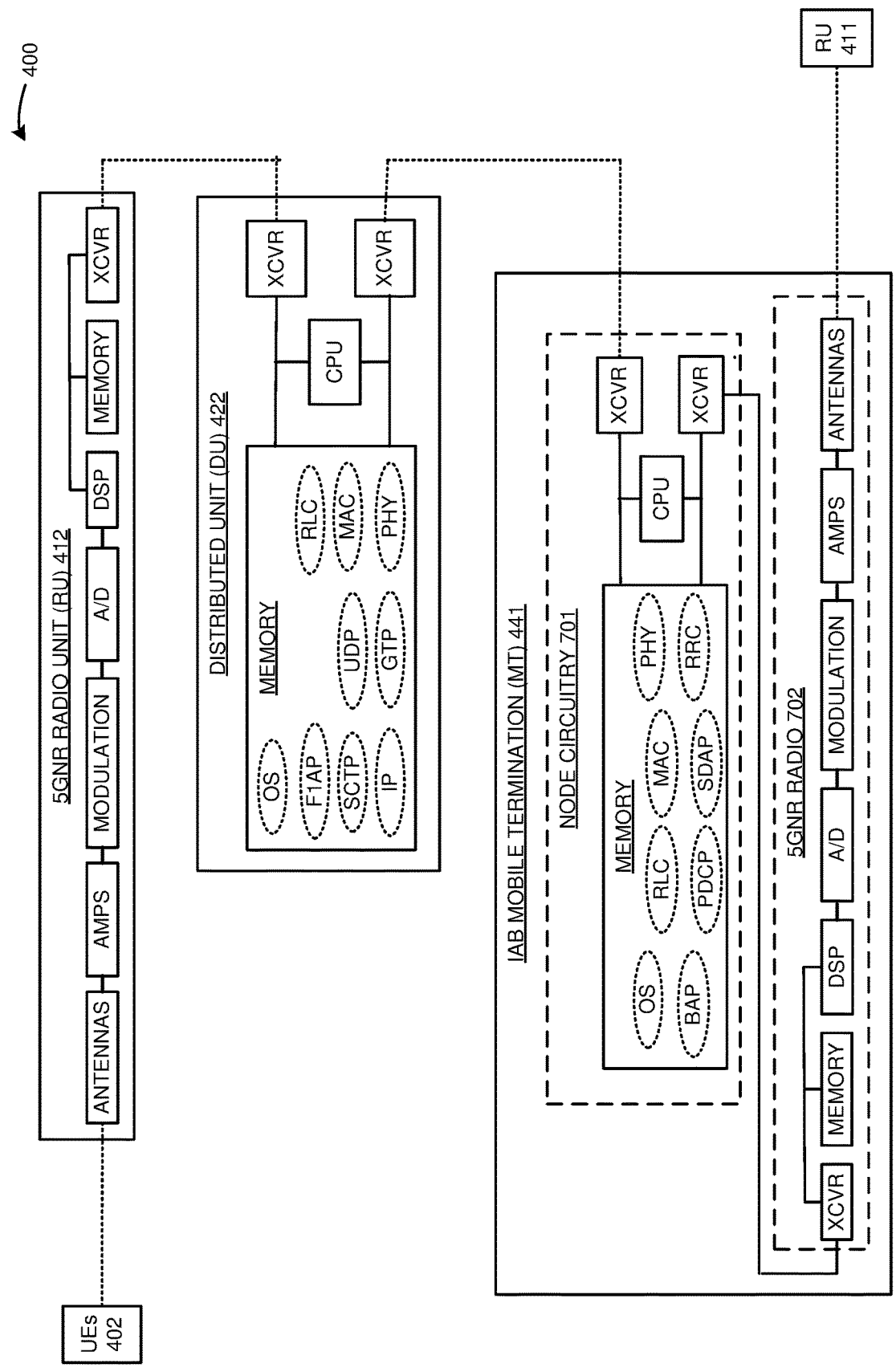
FIG. 7 illustrates an IAB MT in the 5G wireless communication network.

FIG. 7 illustrates IAB MT 441 in the 5G wireless communication network 400. IAB MT 441 comprises an example of IAB MTs 141-142, although MTs 141-142 may differ. IAB MT 442 could be similar to IAB MT 441. UEs 402 are attached to RU 412 which is linked to DU 422 that is coupled to IAB MT 441. RU 412 comprises antennas, amplifiers, filters, modulation, analog-to-digital interfaces, DSP, memory, and transceivers that are coupled over bus circuitry. DU 422 comprises memory, CPU, and transceivers that are coupled over bus circuitry. The memory in DU 422 stores operating systems and network applications for PHY, MAC, RLC, IP, BAP, F1AP, SCTP, UDP, and GTP. The antennas in RU 412 are wirelessly coupled to UEs 402 over 5GNR links. Transceivers in RU 412 are coupled to transceivers in DU 422 over fronthaul links like eCPRI. Transceivers in DU 422 are coupled to transceivers in IAB MT 441 over mid-haul links. IAB MT 441 comprises node circuitry 701 and 5GNR radio 702. 5GNR radio 702 comprises antennas, amplifiers, filters, modulation, analog-to-digital interfaces, DSP, memory, and transceivers that are coupled over bus circuitry. Node circuitry 701 comprises memory, CPU, user interfaces and components, and transceivers that are coupled over bus circuitry. The memory in node circuitry 701 stores an operating system, user applications (USER), and network applications for PHY, MAC, RLC, PDCP, SDAP, RRC, and BAP. The antennas in 5GNR radio 412 are wirelessly coupled to UEs 402 over 5GNR links. Transceivers in 5GNR radio 412 are coupled to transceivers in DU 422. Transceivers in DU 422 are coupled to transceivers in node circuitry 701 over midhaul links. Transceivers in node circuitry 701 are coupled to transceivers in 5GNR radio 702. The antennas in 5GNR radio 702 are wirelessly coupled to RU 411 over 5GNR links. The CPU in node circuitry 701 executes the operating system and network applications to exchange network signaling and user data with DU 422 and with RU 411 over 5GNR radio 702. In particular, the MAC in IAB MT 441 uses resource blocks in the proper channel and subchannel as directed by the MAC in DU 421. The MACs in IAB MT 441 and DU 422 communicate to mitigate interference between UEs 402 and IAB MT 441.

Figure 8:
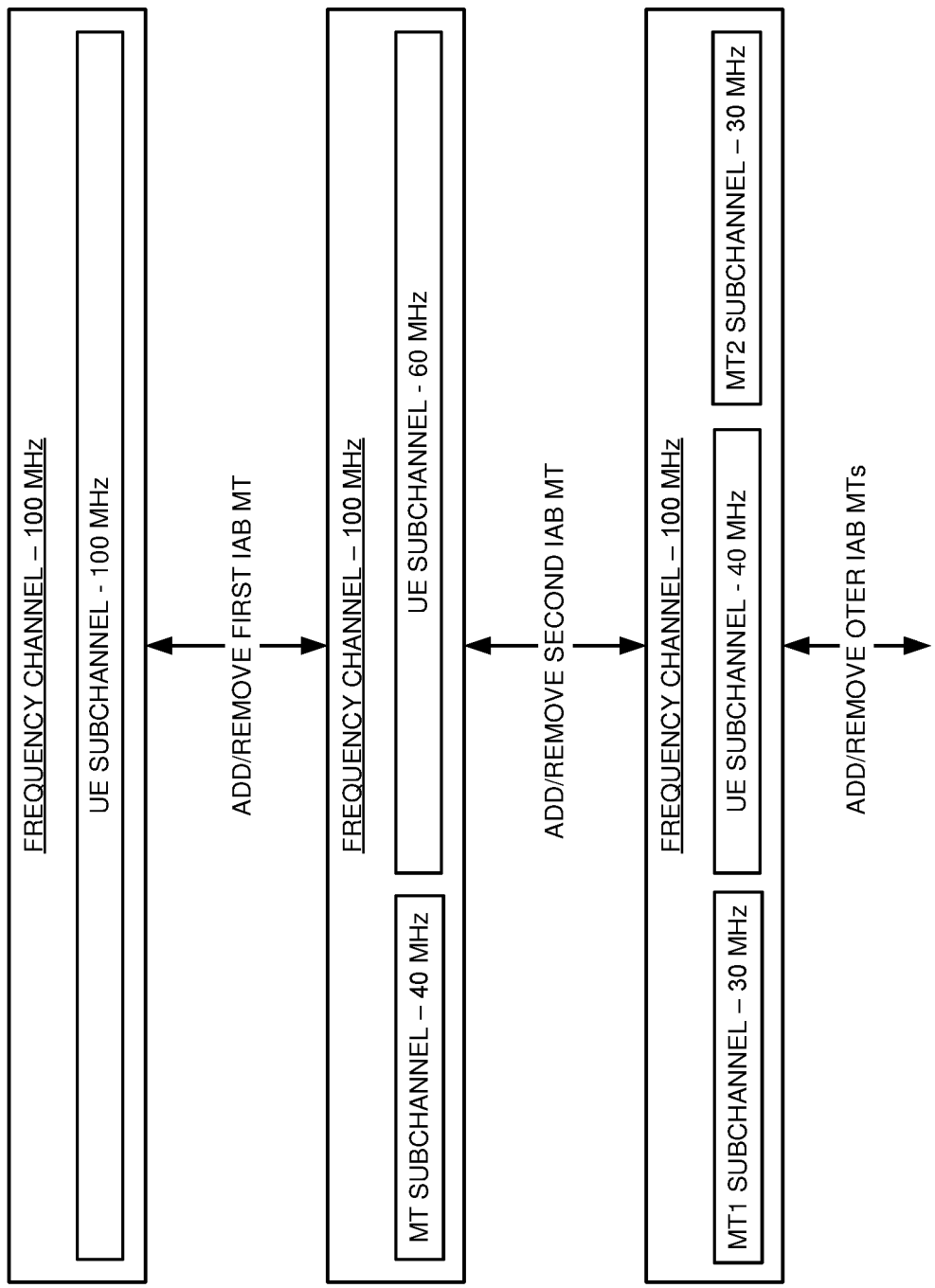
FIG. 8 illustrates an exemplary frequency channel allocation into a UE subchannel and IAB MT subchannels.

FIG. 8 illustrates an exemplary frequency channel allocation into a UE subchannel and IAB MT subchannels. The frequency channel allocation could differ in other examples. A 100 Megahertz (MHz) frequency channel is shown at the top of FIG. 8. When IAB is not used, the entire 100 MHz frequency channel is allocated to a 100 MHz UE subchannel. When the first IAB MT is used, the 100 MHz frequency channel is allocated into an MT subchannel of 40 MHz and UE subchannel of 60 MHz as depicted in the middle of FIG. 8. When the first IAB MT is no longer used, the 100 MHz frequency channel is reallocated back into the 100 MHz UE subchannel as shown at the top of FIG. 8. When the second IAB MT is used while the first IAB MT is still active, the 100 MHz frequency channel is reallocated into a first MT subchannel of 30 MHz, a second MT subchannel of 30 MHz, and a UE subchannel of 40 MHz as depicted at the bottom of FIG. 8. When the second IAB MT is no longer used, the 100 MHz frequency channel is reallocated back into the UE subchannel of 60 MHz and the IAB subchannel of 40 MHz as shown in the middle of FIG. 8. In a similar manner, additional IAB MTs could be added and given their own MT subchannel in the frequency channel.

Figure 9:
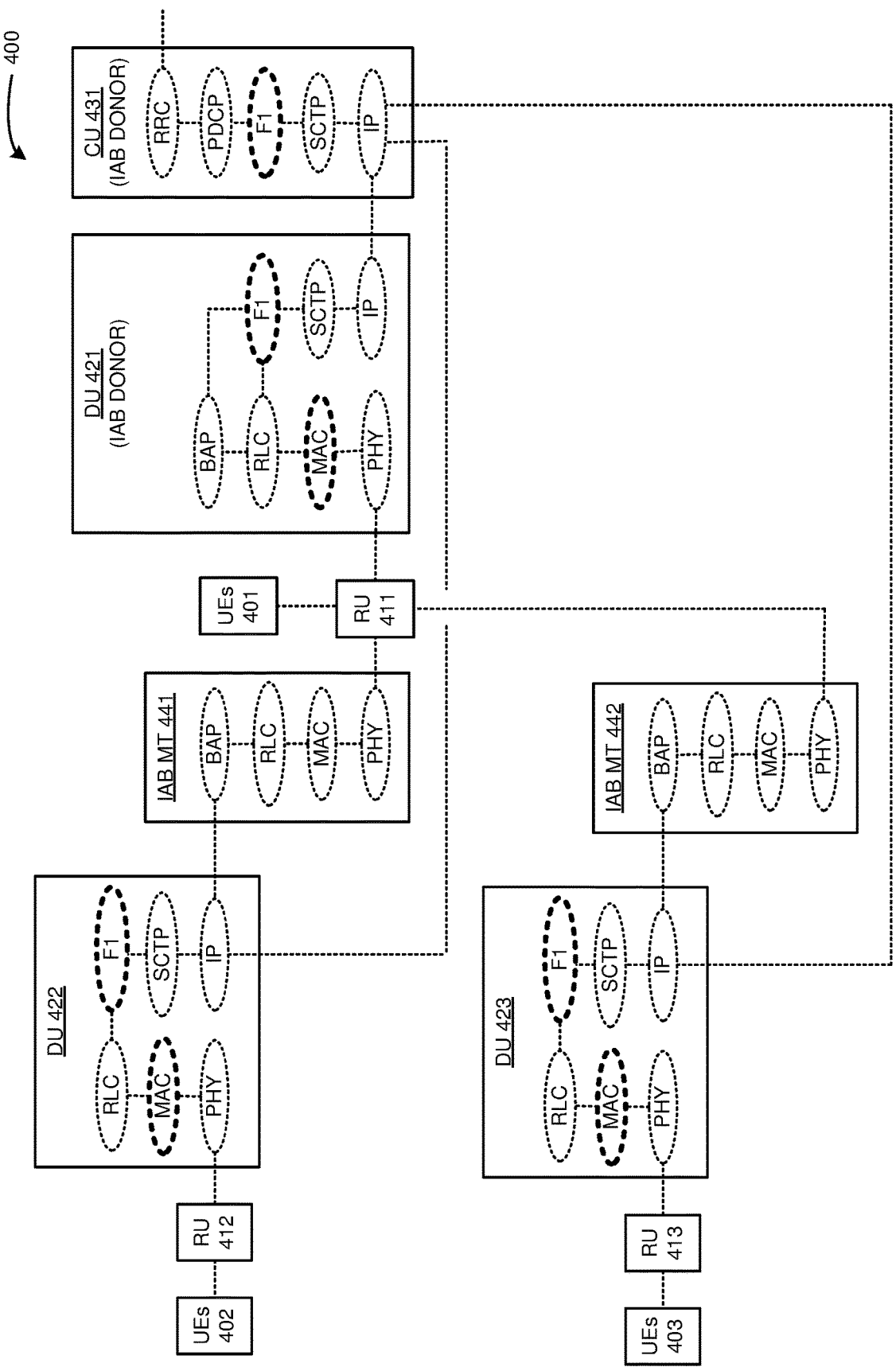
FIG. 9 illustrates an exemplary control-plane operation of the 5G wireless communication network to allocate the frequency channels among the wireless UEs and the wireless IAB MTs.

FIG. 9 illustrates an exemplary control-plane operation of 5G wireless communication network 400 to allocate the frequency channels among wireless UEs 401-403 and wireless IAB MTs 441-442. The operation may vary in other examples. The RRCs in UEs 401 attach to the RRC in CU 431 over the frequency channel, RU 411, DU 421 (PHY-MAC-RLC-F1AP-SCTP-IP) and CU 431 (IP-SCTP-F1AP-PDCP). The RRCs in UEs 402 attach to the RRC in CU 431 over the frequency channel, RU 412, DU 422 (PHY-MAC-RLC-F1AP-SCTP-IP) and CU 431 (IP-SCTP-F1AP-PDCP). The RRCs in UEs 403 attach to the RRC in CU 431 over the frequency channel, RU 413, DU 423 (PHY-MAC-RLC-F1AP-SCTP-IP) and CU 431 (IP-SCTP-F1AP-PDCP). The RRC in CU 431 registers UEs 401-403 with AMF 451. The RRCs in UEs 401-403, the RRC in CU 431, and AMF 451 exchange network signaling to establish data paths. The description now proceeds to FIG. 10.

Figure 10:
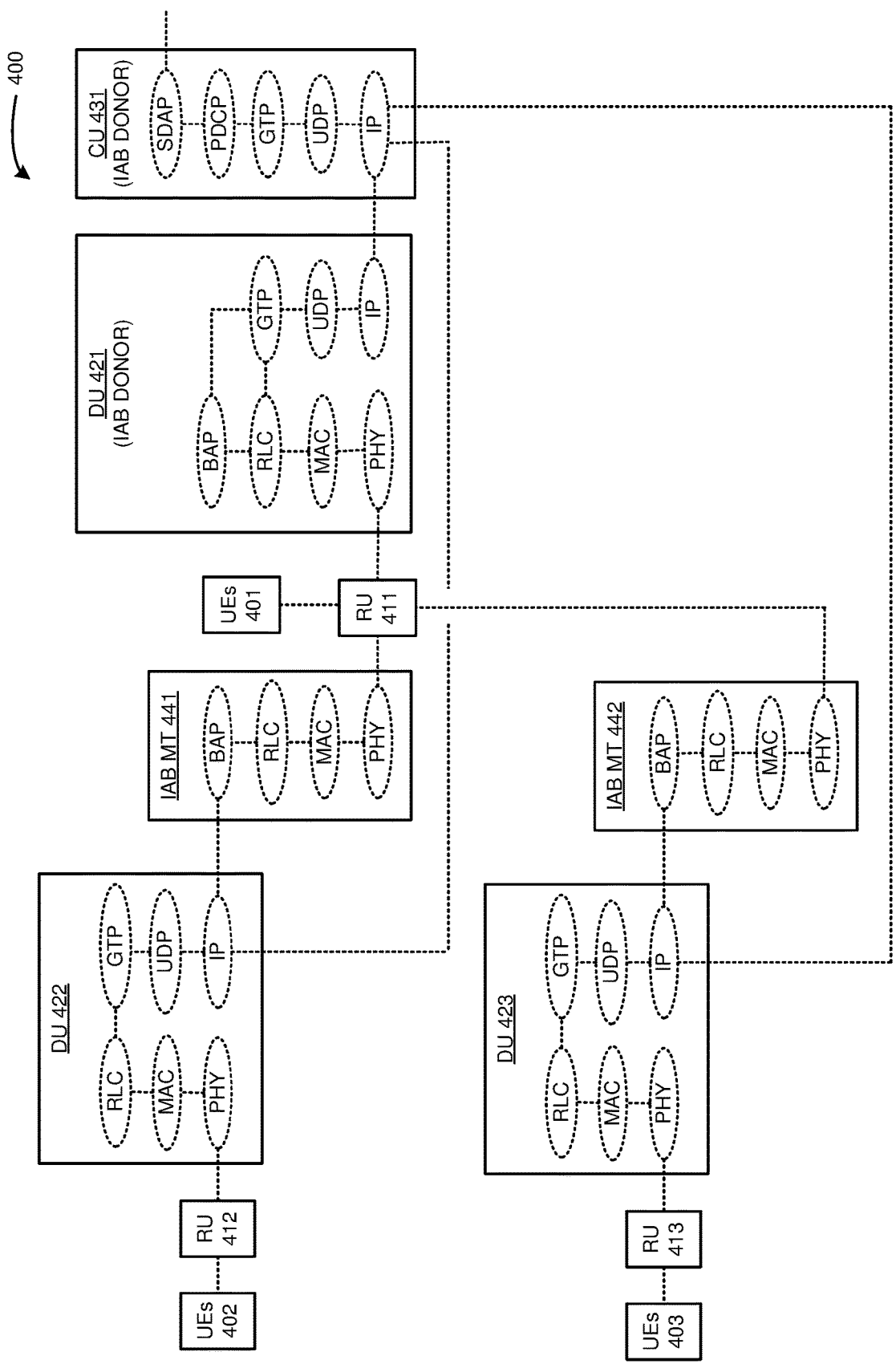
FIG. 10 illustrates an exemplary user-plane operation of the 5G wireless communication network to allocate the frequency channels among the wireless UEs and the wireless IAB MTs.

FIG. 10 illustrates an exemplary user-plane operation of 5G wireless communication network 400 to allocate the frequency channels among wireless UEs 401-403 and wireless IAB MTs 441-442. The operation may vary in other examples. After the exchange of network signaling above to establish the data paths, The SDAPs in UEs 401 and the SDAP in CU 431 communicate over the frequency channel, RU 411, DU 421 (PHY-MAC-RLC-GTP-UDP-IP), and CU 431 (IP-UDP-GTP-PDCP). The SDAPs in UEs 402 and the SDAP in CU 431 communicate over the frequency channel, RU 412, DU 422 (PHY-MAC-RLC-GTP-UDP-IP), and CU 431 (IP-UDP-GTP-PDCP). The SDAPs in UEs 403 and the SDAP in CU 431 communicate over the frequency channel, RU 413, DU 423 (PHY-MAC-RLC-GTP-UDP-IP), and CU 431 (IP-UDP-GTP-PDCP). The SDAP in CU 431 and UPF 453 communicate over the backhaul links. In this example, the midhaul link between DU 422 and CU 431 initially fails.

Referring back to FIG. 9 after the first midhaul failure, the F1AP in DU 422 detects the midhaul failure and requests IAB midhaul from the BAP in IAB MT 441. The BAP in IAB MT 441 connects to the BAP in DU 421 over IAB MT 441 (RLC-MAC-PHY), RU 411, and DU 421 (PHY-MAC-RLC). The F1AP in in DU 422 and the F1AP in CU 431 exchange network signaling over DU 422 (SCTP-IP), IAB MT 441 (BAP-RLC-MAC-PHY), RU 411, DU 421 (PHY-MAC-RLC-BAP-F1AP-SCTP-IP), and CU 431 (IP-SCTP) to reestablish the data paths for UEs 402 over the IAB link. With IAB MT 441 active, the F1AP in CU 431 allocates the frequency channel into the UE subchannel and the MT subchannel. The UE subchannel is for UEs 401 and UEs 403. The MT subchannel is for IAB MT 441 and UEs 402. Network signaling among the F1APs indicates the subchannel assignments. The F1AP in DU 421 directs its MAC to use the UE subchannel for UEs 401 and to use the MT subchannel for IAB MT 441. The F1AP in DU 422 directs its MAC to use the MT subchannel for UEs 402. The MAC in DU 422 and the MAC in IAB 441 communicate to avoid using the same time/frequency resources for UEs 402 and IAB MT 441 in the MT subchannel. The F1AP in DU 423 directs its MAC to use the UE subchannel for UEs 403. The MAC in DU 421 and the MAC in DU 423 may communicate to avoid using the same time/frequency resources for UEs 401 and UEs 403 in the UE subchannel.

Referring back to FIG. 10 after the exchange of network signaling, the SDAPs in UEs 401 and the SDAP in CU 431 communicate over the UE subchannel, RU 411, DU 421 (PHY-MAC-RLC-GTP-UDP-IP), and CU 431 (IP-UDP-GTP-PDCP). The SDAPs in UEs 402 and the SDAP in CU 431 communicate over the IAB MT subchannel, RU 412, DU 422 (PHY-MAC-RLC-GTP-UDP-IP), IAB MT (BAP-RLC-MAC-PHY), the IAB MT subchannel, DU 421 (PHY-MAC-RLC-BAP-GTP-UDP-IP), and CU 431 (IP-UDP-GTP-PDCP). The SDAPs in UEs 403 and the SDAP in CU 431 communicate over the UE subchannel, RU 413, DU 423 (PHY-MAC-RLC-GTP-UDP-IP), and CU 431 (IP-UDP-GTP-PDCP). The SDAPs in CU 431 and UPF 453 communicate over the backhaul links. In this example, the other midhaul link between the IP components of DU 423 and CU 431 now fails.

Referring back to FIG. 9 after the second midhaul failure, the F1AP in DU 423 detects the second midhaul failure and requests IAB midhaul from the BAP in IAB MT 442. The BAP in IAB MT 442 connects to the BAP in DU 421 over IAB MT 442 (RLC-MAC-PHY), RU 411, and DU 421 (PHY-MAC-RLC). The F1AP in DU 423 and the F1AP in CU 431 exchange network signaling over DU 423 (SCTP-IP), IAB MT 442 (BAP-RLC-MAC-PHY), RU 411, DU 421 (PHY-MAC-RLC-BAP-F1AP-SCTP-IP), and CU 431 (IP-SCTP) to reestablish the data paths for UEs 403 over the second IAB link. With IAB MTs 441-442 both active, the F1AP in CU 431 reallocates the frequency channel into a UE subchannel, a first MT subchannel, and a second MT subchannel. The UE subchannel is for UEs 401. The first MT subchannel is for IAB MT 441 and UEs 402. The second MT subchannel is for IAB MT 442 and UEs 403. The network signaling among F1APs indicates the new subchannel assignments. The F1AP in DU 421 directs its MAC to use the UE subchannel for UEs 401, the first MT subchannel for IAB MT 441, and the second MT subchannel for IAB MT 442. The F1AP in DU 422 directs its MAC to use the first MT subchannel for UEs 402. The MAC in DU 422 and the MAC in IAB 441 communicate to avoid using the same time/frequency resources for UEs 402 and IAB MT 441 in the first MT subchannel. The F1AP in DU 423 directs its MAC to use the second MT subchannel for UEs 403. The MAC in DU 423 and the MAC in IAB 442 communicate to avoid using the same time/frequency resources for UEs 403 and IAB MT 443 in the second MT subchannel.

Referring back to FIG. 10 and after the exchange of network signaling, the SDAPs in UEs 401 and the SDAP in CU 431 communicate over the UE subchannel, RU 411, DU 421 (PHY-MAC-RLC-GTP-UDP-IP), and CU 431 (IP-UDP-GTP-PDCP). The SDAPs in UEs 402 and the SDAP in CU 431 communicate over the first IAB MT subchannel, RU 412, DU 422 (PHY-MAC-RLC-GTP-UDP-IP), IAB MT 421 (BAP-RLC-MAC-PHY), the first IAB MT subchannel, DU 421 (PHY-MAC-RLC-BAP-GTP-UDP-IP), and CU 431 (IP-UDP-GTP-PDCP). The SDAPs in UEs 403 and the SDAP in CU 431 communicate over the second IAB MT subchannel, RU 413, DU 423 (PHY-MAC-RLC-GTP-UDP-IP), IAB MT 422 (BAP-RLC-MAC-PHY), the second IAB MT subchannel, DU 421 (PHY-MAC-RLC-BAP-GTP-UDP-IP), and CU 431 (IP-UDP-GTP-PDCP). The SDAP in CU 431 and UPF 453 communicate over the backhaul links.

When the failed midhaul links for DU 422 are restored (but not DU 423), the F1AP in DU 422 reestablishes direct midhaul to CU 431 and terminates its IAB midhaul link. The F1AP in CU 431 reallocates the frequency channel into the UE subchannel and the MT subchannel. The F1AP in CU 431 directs the F1APs in DUs 421 and 422 to use the UE subchannel for UEs 401 and 402 and directs the F1AP in DU 423 to use the MT subchannel. The F1AP in DU 421 directs its MAC to use the UE subchannel for UEs 401 and to use the MT subchannel for IAB MT 442. The F1APs in DUs 421 and 422 direct their MACs to use the UE subchannel for UEs 401 and 402. The F1AP in DU 423 direct its MACs to use the MT subchannel for UEs 403. The user-plane operation is the same as described above for this particular channel allocation when DU 423 uses IAB midhaul.

When the failed midhaul links for DU 423 are restored (but not DU 422), the F1AP in DU 423 reestablishes direct midhaul to CU 431 and terminates the IAB midhaul link. The F1AP in CU 431 reallocates the frequency channel into the UE subchannel and the MT subchannel. The F1AP in CU 431 directs the F1APs in DUs 421 and 423 to use the UE subchannel for UEs 401 and 403 and directs the F1AP in DU 422 to use the MT subchannel. The F1AP in DU 421 directs its MAC to use the UE subchannel for UEs 401 and to use the MT subchannel for IAB MT 441. The F1AP in DU 422 direct its MACs to use the MT subchannel for UEs 402. The F1AP in DU 423 directs its MACs to use the UE subchannel for UEs 403. The user-plane operation is the same as described above for this particular channel allocation when DU 422 uses IAB midhaul.

When the failed midhaul links for both DU 422 and DU 423 are restored, the F1APs in DUs 422-423 reestablish direct midhaul to CU 431 and terminates their IAB midhaul links. The F1AP in CU 431 reallocates the entire frequency channel to the UE subchannel. The F1AP in CU 431 directs the F1APs in DUs 421-423 to use the entire frequency channel for UEs 401-403. The F1APs in DUs 421-423 direct their MACs to use the entire frequency channel for UEs 401-403. The user-plane operation is the same as described above for this particular channel allocation when DUs 422-423 do not use IAB midhaul.

The wireless data network circuitry described above comprises computer hardware and software that form special-purpose wireless access node circuitry to serve wireless UEs and IAB MTs. The computer hardware comprises processing circuitry like CPUs, DSPs, GPUs, transceivers, bus circuitry, and memory. To form these computer hardware structures, semiconductors like silicon or germanium are positively and negatively doped to form transistors. The doping comprises ions like boron or phosphorus that are embedded within the semiconductor material. The transistors and other electronic structures like capacitors and resistors are arranged and metallically connected within the semiconductor to form devices like logic circuitry and storage registers. The logic circuitry and storage registers are arranged to form larger structures like control units, logic units, and Random-Access Memory (RAM). In turn, the control units, logic units, and RAM are metallically connected to form CPUs, DSPs, GPUs, transceivers, bus circuitry, and memory.

In the computer hardware, the control units drive data between the RAM and the logic units, and the logic units operate on the data. The control units also drive interactions with external memory like flash drives, disk drives, and the like. The computer hardware executes machine-level software to control and move data by driving machine-level inputs like voltages and currents to the control units, logic units, and RAM. The machine-level software is typically compiled from higher-level software programs. The higher-level software programs comprise operating systems, utilities, user applications, and the like. Both the higher-level software programs and their compiled machine-level software are stored in memory and retrieved for compilation and execution. On power-up, the computer hardware automatically executes physically-embedded machine-level software that drives the compilation and execution of the other computer software components which then assert control. Due to this automated execution, the presence of the higher-level software in memory physically changes the structure of the computer hardware machines into special-purpose wireless access node circuitry to serve wireless UEs and IAB MTs.

The above description and associated figures teach the best mode of the invention. The following claims specify the scope of the invention. Note that some aspects of the best mode may not fall within the scope of the invention as specified by the claims. Those skilled in the art will appreciate that the features described above can be combined in various ways to form multiple variations of the invention. Thus, the invention is not limited to the specific embodiments described above, but only by the following claims and their equivalents.

What is claimed is:

1. A method of operating a wireless access node that serves wireless User Equipment (UEs) and wireless Integrated Access and Backhaul Mobile Terminations (IAB MTs), the method comprising:
   a radio wirelessly exchanging first access communications with the wireless UEs over a frequency channel and wirelessly receiving a first IAB request from a first one of the wireless IAB MTs;
   in an IAB donor Centralized Unit (CU), an F1AP detecting the first wireless IAB MT and in response, allocating the frequency channel into a UE subchannel and an MT subchannel responsive to the first IAB request, and indicating the UE subchannel and the MT subchannel to another F1AP in an IAB donor Distributed Unit (DU);
   in the IAB donor DU, the other F1AP receiving the indication of the UE subchannel and the MT subchannel, and in response, directing a Media Access Control (MAC) in the IAB donor DU to use the UE subchannel for the wireless UEs and to use the MT subchannel for the first IAB MT;
   in response to MAC signaling, the radio wirelessly exchanging second access communications with the wireless UEs over the UE subchannel, wirelessly exchanging first backhaul communications with the first wireless IAB MT over the MT subchannel, and wirelessly receiving a second IAB request from a second one of the wireless IAB MTs;
   the F1AP detecting the second wireless IAB MT and in response, reallocating the frequency channel into a new UE subchannel, a first MT subchannel, and a second MT subchannel responsive to the second IAB request, and indicating the new UE subchannel, the first MT subchannel, and the second MT subchannel to the other F1AP;
   the other F1AP receiving the indication of the new UE subchannel, the first MT subchannel, and the second MT subchannel, and in response, directing the MAC to use the new UE subchannel for the wireless UEs, to use the first MT subchannel for the first IAB MT, and to use the second MT subchannel for the second IAB MT; and
   in response to additional MAC signaling, the radio wirelessly exchanging third access communications with the wireless UEs over the new UE subchannel, wirelessly exchanging second backhaul communications with the first wireless IAB MT over the first MT subchannel, and wirelessly exchanging third backhaul communications with the second wireless IAB MT over the second MT subchannel.

2. The method of claim 1 further comprising:
   the F1AP generating signaling that indicates the MT subchannel;
   the radio wirelessly transferring the signaling that indicates the MT subchannel to the first wireless IAB MT;
   the F1AP generating additional signaling that indicates the first MT subchannel and the second IAB channel;
   the radio wirelessly transferring the additional signaling that indicates the first MT subchannel to the first wireless IAB MT and wirelessly transferring the additional signaling that indicates the second MT subchannel to the second wireless IAB MT.

3. The method of claim 1 further comprising:
   the radio wirelessly receiving an IAB deregistration from the first wireless IAB MT;
   the F1AP reallocating the frequency channel into another new UE subchannel and a new MT subchannel responsive to the IAB deregistration; and
   the radio wirelessly exchanging fourth access communications with the wireless UEs over the other new UE subchannel and wirelessly exchanging fourth backhaul communications with the second wireless IAB MT over the new MT subchannel.

4. The method of claim 1 further comprising:
the radio wirelessly receiving an IAB deregistration from the first wireless IAB MT;
the F1AP reallocating the frequency channel into another new UE subchannel and a new MT subchannel responsive to the IAB deregistration; and
the F1AP generating signaling that indicates the new MT subchannel;
the radio wirelessly transferring the signaling that indicates the new MT subchannel to the second wireless IAB MT.

5. The method of claim 1 further comprising:
the radio wirelessly receiving an IAB deregistration from the second wireless IAB MT;
the F1AP reallocating the frequency channel into another new UE subchannel and a new MT subchannel responsive to the IAB deregistration; and
the radio wirelessly exchanging fourth access communications with the wireless UEs over the other new UE subchannel and wirelessly exchanging fourth backhaul communications with the first wireless IAB MT over the new MT subchannel.

6. The method of claim 1 further comprising:
the radio wirelessly receiving an IAB deregistration from the second wireless IAB MT;
the F1AP reallocating the frequency channel into another new UE subchannel and a new MT subchannel responsive to the IAB deregistration;
the F1AP generating signaling that indicates the new MT subchannel; and
the radio wirelessly transferring the signaling that indicates the new MT subchannel to the first wireless IAB MT.

7. The method of claim 1 further comprising:
the F1AP generating signaling that indicates the new MT subchannel;
the radio wirelessly transferring the signaling that indicates the MT subchannel to a different F1AP in another DU that is served by the first IAB MT.

8. The method of claim 7 further comprising:
the different F1AP in the other DU that is served over the first IAB MT receiving the signaling that indicates the MT subchannel, and in response, directing another MAC in the other DU that is served over the first IAB MT to use the MT subchannel for second UEs that are directly served by the other DU over the first IAB MT.

9. The method of claim 1 wherein the radio wirelessly exchanging the access communications and the backhaul communications comprises wirelessly exchanging wireless Fifth Generation New Radio (5GNR) signals.

10. A wireless access node to serve wireless User Equipment (UEs) and wireless Integrated Access and Backhaul Mobile Terminations (IAB MTs), the wireless access node comprising:
a radio configured to wirelessly exchange first access communications with the wireless UEs over a frequency channel and wirelessly receive a first IAB request from a first one of the wireless IAB MTs;
in an IAB donor Centralized Unit (CU), an F1AP configured to detect the first wireless IAB MT and in response, allocate the frequency channel into a UE subchannel and an MT subchannel responsive to the first IAB request, and indicate the UE subchannel and the MT subchannel to another F1AP in an IAB donor Distributed Unit (DU);
in the IAB donor DU, the other F1AP configured to receive the indication of the UE subchannel and the MT subchannel, and in response, direct a Media Access Control (MAC) in the IAB donor DU to use the UE subchannel for wireless UEs and to use the MT subchannel for the first IAB MT;
in response to MAC signaling, the radio configured to wirelessly exchange second access communications with the wireless UEs over the UE subchannel, wirelessly exchange first backhaul communications with the first wireless IAB MT over the MT subchannel, and wirelessly receive a second IAB request from a second one of the wireless IAB MTs;
the F1AP configured to detect the second wireless IAB MT and in response, reallocate the frequency channel into a new UE subchannel, a first MT subchannel, and a second MT subchannel responsive to the second IAB request, and indicate the new UE subchannel, the first MT subchannel, and the second MT subchannel to the other F1AP;
the other F1AP configured to receive the indication of the new UE subchannel, the first MT subchannel, and the second MT subchannel, and in response, direct the MAC to use the new UE subchannel for the wireless UEs, to use the first MT subchannel for the first IAB MT, and to use the second MT subchannel for the second IAB MT; and
in response to additional MAC signaling, the radio configured to wirelessly exchange third access communications with the wireless UEs over the new UE subchannel, wirelessly exchange second backhaul communications with the first wireless IAB MT over the first MT subchannel, and wirelessly exchange third backhaul communications with the second wireless IAB MT over the second MT subchannel.

11. The wireless access node of claim 10 further comprising:
the F1AP configured to generate signaling that indicates the MT subchannel;
the radio configured to wirelessly transfer the signaling that indicates the MT subchannel to the first wireless IAB MT;
the F1AP configured to generate additional signaling that indicates the first MT subchannel and the second IAB channel;
the radio configured to wirelessly transfer the additional signaling that indicates the first MT subchannel to the first wireless IAB MT and wirelessly transfer the additional signaling that indicates the second MT subchannel to the second wireless IAB MT.

12. The wireless access node of claim 10 further comprising:
the radio configured to wirelessly receive an IAB deregistration from the first wireless IAB MT;
the F1AP configured to reallocate the frequency channel into another new UE subchannel and a new MT subchannel responsive to the IAB deregistration; and
the radio configured to wirelessly exchange fourth access communications with the wireless UEs over the other new UE subchannel and wirelessly exchange fourth backhaul communications with the second wireless IAB MT over the new MT subchannel.

13. The wireless access node of claim 10 further comprising:
the radio configured to wirelessly receive an IAB deregistration from the first wireless IAB MT;
the F1AP configured to reallocate the frequency channel into another new UE subchannel and a new MT subchannel responsive to the IAB deregistration; and the F1AP configured to generate signaling that indicates the new MT subchannel;

the radio configured to wirelessly transfer the signaling that indicates the new MT subchannel to the second wireless IAB MT.

14. The wireless access node of claim 10 further comprising:

the radio configured to wirelessly receive an IAB deregistration from the second wireless IAB MT;

the F1AP configured to reallocate the frequency channel into another new UE subchannel and a new MT subchannel responsive to the IAB deregistration; and the radio configured to wirelessly exchange fourth access communications with the wireless UEs over the other new UE subchannel and wirelessly exchange fourth backhaul communications with the first wireless IAB MT over the new MT subchannel.

15. The wireless access node of claim 10 further comprising:

the radio configured to wirelessly receive an IAB deregistration from the second wireless IAB MT;

the F1AP configured to reallocate the frequency channel into another new UE subchannel and a new MT subchannel responsive to the IAB deregistration;

the F1AP configured to generate signaling that indicates the new MT subchannel; and the radio configured to wirelessly transfer the signaling that indicates the new MT subchannel to the first wireless IAB MT.

16. The wireless access node of claim 10 further comprising:

the F1AP configured to generate signaling that indicates the new MT subchannel;

the radio configured to wirelessly transfer the signaling that indicates the MT subchannel to a different F1AP in another DU that is served by the first IAB MT.

17. The wireless access node of claim 15 further comprising:

the different F1AP in the other DU that is served over the first IAB MT configured to receive the signaling that indicates the MT subchannel, and in response, direct another MAC in the other DU that is served over the first IAB MT to use the MT subchannel for second UEs that are directly served by the other DU over the first IAB MT.

18. The wireless access node of claim 10 wherein the radio is configured to wirelessly exchange wireless Fifth Generation New Radio (5GNR) signals.

19. The method of claim 1 wherein the radio wirelessly exchanging the access communications and the backhaul communications comprises wirelessly exchanging wireless Long Term Evolution (LTE) signals.

20. The wireless access node of claim 10 wherein the radio is configured to wirelessly exchange wireless Long Term Evolution (LTE) signals.

* * * * *